United States Patent [19]

Moffitt

[11] Patent Number: 5,030,511
[45] Date of Patent: Jul. 9, 1991

[54] EXTRUDED VINYLIDENE CHLORIDE COPOLYMER FLEXIBLE PACKAGING FILM

[75] Inventor: Ronald D. Moffitt, Duncan, S.C.

[73] Assignee: W. R. Grace & Co.-Conn., Duncan, S.C.

[21] Appl. No.: 364,664

[22] Filed: Jun. 9, 1989

[51] Int. Cl.$^5$ .................. B32B 27/08; C08L 27/08; C08K 5/15

[52] U.S. Cl. .................. 428/336; 428/516; 428/518; 428/520; 428/910; 264/176.1; 524/109; 524/306

[58] Field of Search .............. 428/516, 520, 518, 910, 428/336

[56] References Cited

U.S. PATENT DOCUMENTS

| | | | |
|---|---|---|---|
| 2,205,449 | 6/1940 | Wiley | 18/48 |
| 2,320,112 | 5/1943 | Wiley | 18/48 |
| 3,524,795 | 8/1970 | Peterson | 161/165 |
| 3,741,253 | 6/1973 | Brax et al. | 138/137 |
| 3,958,721 | 5/1976 | Kushida et al. | 222/107 |
| 4,112,181 | 9/1978 | Baird, Jr. et al. | 428/336 |
| 4,320,175 | 3/1982 | Hisazumi et al. | 428/518 |
| 4,360,612 | 11/1982 | Trumbull et al. | 523/351 |
| 4,401,788 | 8/1983 | Hiyoshi et al. | 524/714 |
| 4,418,168 | 11/1983 | Johnson | 524/109 |
| 4,608,302 | 8/1986 | Schirmer | 428/349 |
| 4,686,148 | 8/1987 | Havens | 528/520 |
| 4,714,638 | 12/1987 | Lustig et al. | 428/35 |
| 4,798,751 | 1/1989 | Schuetz | 428/349 |

FOREIGN PATENT DOCUMENTS 968689  6/1975  Canada.
3605405 12/1987  Fed. Rep. of Germany.

OTHER PUBLICATIONS

U.S. Vikoflex.
U.S. Ency. of Polymer Science, pp. 174 & 175 of vol. 14.
U.S. Monoplex S-73, C. P. Hall Company.
U.S. Monoplex S-75, C. P. Hall Company.

Primary Examiner—P. C. Sluby
Attorney, Agent, or Firm—John J. Toney; William D. Lee, Jr.; Jennifer L. Skord

[57] ABSTRACT

This invention relates to films made from vinylidene chloride copolymers. Specifically, this invention relates to a method and composition for lowering the oxygen permeability and enhancing the thermal stability and enhancing the melt shear stability of packaging films having a layer of vinylidene chloride copolymer film by adding a processing aid such as an epoxy resin to vinylidene chloride copolymer of low molecular weight. The conventional stabilizer/plasticizer combination of epoxy resin and 2-ethyl-hexyl diphenyl phosphate may be employed with the vinylidene chloride copolymer. The layer of vinylidene chloride copolymer can be as thin as 0.18 mil.

10 Claims, No Drawings

EXTRUDED VINYLIDENE CHLORIDE COPOLYMER FLEXIBLE PACKAGING FILM

BACKGROUND OF THE INVENTION

This invention relates generally to vinylidene chloride copolymers containing a processing aid and flexible film produced therefrom. More particularly, vinylidene chloride copolymers of low molecular weight, with a processing aid preferably also of low molecular weight, have been surprisingly found to be of enhanced thermal stability. Thus, they can be extruded into film at a higher temperature, or at conventional temperatures but with less processing aid. The vinylidene chloride copolymer layer in the extruded film can be very thin, as thin as 0.18 mils, yet the film will still possess excellent oxygen barrier characteristics exhibiting an oxygen permeability under about 8 cc/mil/m$^2$/day/atmosphere. This is equivalent to an oxygen transmission rate under about 44.44 cc/sq m/day atmosphere for this film having a 0.18 mil gauge vinylidene chloride copolymer layer.

Flexible thermoplastic films made of vinylidene chloride copolymer, hereinafter referred to generally as PVDC (such materials are also commonly known as "saran", which, in the United States has become generic and is not a registered trademark) have been used for a long time to package food products which include cheese, fresh and processed meats, and a wide variety of other food and non-food items. PVDC is a barrier to oxygen and thus such films protect food from spoilage.

Processing aids are standard practice for PVDC to be successfully extruded at commercial rates, i.e. the vinylidene chloride copolymers must be stabilized and plasticized. A successful plasticizer-stabilizer combination is the liquid stabilizer, epichlorohydrin/bisphenol A, an epoxy resin sold as EPON resin 828 by the Shell Chemical Company, and the plasticizer, 2-ethyl hexyl diphenyl phosphate sold as Santicizer-141 by Monsanto Chemical Co. Other known liquid stabilizers include epoxy compounds such as epoxidized linseed oil and epoxidized soybean oil and citrates. A quite successful and satisfactory plasticizer/stabilizer package is made using approximately 4% of Epon 828 and approximately 2% of Santicizer-141 in PVDC. For clarity, it is noted that sometimes the art refers to the epoxy compounds as plasticizers instead of as stabilizers.

A method of producing a multilayer film having a PVDC layer is disclosed in U.S. Pat. No. 4,112,181, issued on Sept. 5, 1978 to Baird, Jr. et al. This patent describes a method of coextruding a tubular film wherein the walls of the tube have at least three layers, a center layer being a PVDC layer. The tubular film is subsequently biaxially oriented by the trapped bubble technique. The 3-layer film may be cross-linked by electron beam irradiation.

Another satisfactory method of producing a multilayer saran film is disclosed in U.S. Pat. No. 3,741,253, issued on June 26, 1973 to Brax et al, which discloses a multilayer, biaxially oriented film having a PVDC barrier layer. This film is made by an extrusion coating process in which a substrate layer or layers of a polymer such as polyethylene or ethylene vinyl acetate copolymer is extruded in the form of a tube, cross-linked by irradiation, and inflated. A layer of PVDC is extrusion coated onto the inflated tubing, and another layer or layers of polymer is simultaneously or sequentially extrusion coated onto the PVDC. After cooling, this multilayer tubular structure is flattened and rolled up. Then, the tube is inflated, and heated to its orientation temperature, thereby biaxially orienting the film. The bubble is rapidly cooled to set the orientation. This process produces a heat shrinkable barrier film with low oxygen permeability. Also, the advantages of a cross-linked film are provided without subjecting the PVDC layer to irradiation which tends to degrade saran. The barrier layer in the examples of the patent to Brax et al is a plasticized copolymer of vinylidene chloride and vinyl chloride.

In Canadian Patent No. 968,689, issued on June 5, 1975 to Gillio-tos et al, the effect of plasticizers such as dibutyl sebacate on the barrier properties of a PVDC barrier layer in a multilayer thermoplastic packaging film is described. First, the Gillio-tos et al patent discloses that homopolymers of vinylidene chloride cannot be converted into film by conventional extrusion techniques because they decompose very rapidly at the temperature of extrusion. Second, by copolymerizing vinylidene chloride with minor amounts of one or more other monomers such as vinyl chloride, methyl acrylate, methyl methacrylate, acryonitile, etc. it is possible to produce copolymers which, when mixed with suitable plasticizers, can be extruded into films which can be oriented by stretching to give heat shrinkable film. The oriented, heat shrinkable, PVDC films are widely used for packaging purposes, particularly for packaging food. As stated in Gillio-tos et al, vinylidene chloride copolymers need to be plasticized so that they can be extruded and stretched into oriented films at commercial rates. The greater the proportion of plasticizer, the lower the viscosity and the easier the polymer is to extrude and orient and the better the abuse resistance of the final product. On the other hand, the oxygen transmission rate of the final product also increases with increasing plasticizer content and for many purposes, especially packaging food, it is vital that the oxygen transmission rate is low. In recent years, the packaging industry has become increasingly demanding and for current commercial practices an oxygen transmission rate below 100 cc/24 hours/m$^2$/atmosphere at room temperature is expected and below 50 is highly desirable. The test for oxygen transmission is conducted as per ASTM D3985.

Also, as the thickness of the vinylidene chloride copolymer layer decreases, the oxygen transmission rate will increase. Thus, for thin films, the oxygen transmission rate still should meet the standard of less than 100, preferably less than 50 cc/24 hrs/sq m/atm. As mentioned above, the thin films (0.18 mil vinylidene chloride copolymer layer) of the invention do.

Of interest is U.S. Pat. No. 4,714,638 (Dec. 22, 1987) to Lustig et al, assignors to Viskase. This patent discloses heat-shrinkable, biaxially stretched multi-layer film having a barrier layer of PVDC wherein the comonomer of the PVDC is methyl acrylate in an amount of 5 to 15% by weight. This patent discusses using conventional plasticizers for the PVDC-MA, such as dibutyl sebacate or epoxidized soybean oil. Similar to U.S. Pat. No. 4,714,638 is U.S. Pat. No. 4,798,751 (Jan. 17, 1989), Schuetz, also assigned to Viskase, wherein the PVDC layer of the biaxially stretched, heat-shrinkable multilayer film is a blend of 2.9-13.5% PVDC-MA and 2.9-11.6% PVDC-VCl. This latter patent also discusses dibutyl sebacate and epoxidized soybean oil.

Also of interest is U.S. Pat. No. 4,320,175 issued March 16, 1982 to Hisazumi et al assignors to Kureha, which shows a PVDC layer composed of PVDC of 0.030 to 0.050 reduced viscosity heat-pressure laminated to a PVDC layer composed of PVDC of 0.050 to 0.075 reduced viscosity. Epoxy compounds are used as stabilizers for the PVDC.

Also of interest are the following patents which show various additives for PVDC. U.S. Pat. No. 4,401,788, issued Aug. 30, 1983 to Hiyoshi et al, assignors to Asahi Dow, shows a PVDC latex with an anionic surfactant, a nonionic surfactant, and a catonic surfactant. U.S. Pat. No. 4,360,612, issued Nov. 23, 1982 to Trumbull et al, assignors to Dow, shows extruded PVDC film containing an alkali metal salt of an alkylaryl sulfonic acid. U.S. Pat. No. 4,418,168, issued Nov. 29, 1983 to Johnson, assignor to Dow, shows stabilizing particulate PVDC by coating thereon a dispersion of tetrasodium pyrophosphate (TSPP) in liquid plasticizer such as epoxidized soybean oil and epoxidized linseed oil. U.S. Pat. Nos. 2,205,449, issued June 25, 1940 and 2,320,112, issued May 25, 1943, both to Wiley, assignor to Dow, show PVDC plasticized with phenoxypropylene oxide (lines 48-49, column 1 of '449) and PVDC plasticized with di-(alpha-phenyl-ethyl) ether (line 16, column 2 of '112). German Patent 3,605,405, priority Feb. 20, 1986, published Dec. 12, 1987, shows 5-layer films with a PVDC core layer, wherein the EVA adhesion layers on each side of the PVDC core layer contain TSPP to heat stabilize the PVDC core layer. U.S. Pat. No. 3,524,795, issued Aug. 18, 1970 to Peterson, assignor to Dow, shows multiple layer PVDC films and mentions at lines 55-59 of column 4 typical plasticizers for PVDC being acetal tributyl citrate, epoxidized soybean oil, and dibutyl sebacate.

Among the plasticizers for thermoplastics which are listed in general articles and in literature references is glycerol or glycerin. Glycerin together with the above-mentioned epoxy resins as a plasticizer combination for PVDC is disclosed in U.S. Pat. No. 4,686,148 to Havens.

An object of the present invention is to improve the thermal stability of vinylidene chloride copolymers and to lessen their tendency to degrade while being extruded, and hence provide improved melt shear stability. An advantage is that PVDC can be extruded at higher temperatures. Alternatively, the PVDC can be extruded at the same conventional temperature, but with less additive to achieve thermal stability. The less the additive is, the lower the oxygen permeability is. Thus another advantage is that films with a thinner PVDC layer can be used and they will have a low oxygen permeability comparable to films with a thicker PVDC layer (and more additive). The after orientation thickness (after biaxial stretching) can be as low as less than about 0.29 mils, preferably less than about 0.26 mils, more preferably less than about 0.23 mils, most preferably less than about 0.20 mils. The limit thickness is about 0.08 mils.

SUMMARY OF INVENTION

The present invention provides for an extrudable vinylidene chloride polymeric composition comprising:
(a) about 0.01% to 6% by weight of processing aid, and
(b) low weight-average molecular weight vinylidene chloride copolymer wherein the major portion of the copolymer is vinylidene chloride.

The present invention also provides for a multilayer polymeric film comprising:
(a) first and second layers; and
(b) a barrier layer disposed between said first and second layers, said barrier layer comprising
(1) about 0.01% to 6% processing aid by weight, and
(2) low weight-average molecular weight vinylidene chloride copolymer wherein the major portion of the copolymer is vinylidene chloride.

Optionally, this multilayer film may be irradiated by electron beam at a dosage of about 0.5 to about 6.0 MR with minimal or no discoloration to the vinylidene chloride copolymer layer.

The invention also provides that in a flexible polymeric film of vinylidene chloride copolymer wherein the major portion of the copolymer is vinylidene chloride, said vinylidene chloride copolymer containing a processing aid, the improvement comprising the vinylidene chloride copolymer is of a weight-average molecular weight of about 100,000 or less. Preferably, when this film is stretch oriented, the vinylidene chloride copolymer layer has a thickness less than about 0.29 mil, and can be as low as about 0.08 mil. A very desirable thickness is 0.18 mil, and at this thickness the film will exhibit an excellent oxygen transmission rate less than about 45 cc/sq m/24 hrs/atmosphere.

The invention also provides a multi-layer biaxially stretched heat-shrinkable film comprising a first layer of ethylene vinyl acetate copolymer having a melt index greater than about 1.2, a second layer of ethylene vinyl acetate copolymer having a melt index greater than about 1.2, and disposed therebetween a core layer of vinylidene chloride copolymer, said vinylidene chloride copolymer layer being on each surface in direct surface-to-surface contact with each of said first and second ethylene vinyl acetate copolymer layers, wherein the major portion of the vinylidene chloride copolymer is vinyl chloride, and said vinylidene copolymer layer contains a processing aid of molecular weight less than about 700, and said vinylidene chloride copolymer is of weight-average molecular weight less than about 100,000, and said vinylidene chloride copolymer layer has a thickness less than about 0.29 mils. Most preferably, the thickness is not greater than about 0.20 mils.

The invention also provides that in a method of improving the heat stability of vinylidene chloride copolymer during tubular extrusion with a hot blown bubble followed by biaxial stretch orientation, the improvement comprising extruding a film with a layer of vinylidene chloride copolymer blend comprising: (a) about 0.01% to 6% by weight of processing aid, (b) low weight-average molecular weight of about 100,000 or less vinylidene chloride copolymer wherein the major portion of the copolymer is vinylidene chloride, and (c) the vinylidene chloride copolymer blend layer has a thickness after orientation less than about 0.29 mils.

DETAILED DESCRIPTION

It has been surprisingly discovered that the addition of processing aids to low weight-average molecular weight vinylidene chloride copolymers provides several improvements to extrusion of vinylidene chloride copolymers and films produced thereby. Preferably, the processing aid is also of low molecular weight. The enhanced thermal stability allows reduction of conventional additives, i.e. plasticizers/ stabilizers, the reduction of which improves oxygen barrier properties. Furthermore, the improved thermal stability results in generation of less shear heat during processing which leads to less vinylidene chloride copolymer degradation. This allows reduction or modification of the additives normally required to prevent heat-induced degradation which, in turn, can lead to further oxygen barrier improvements. Also, an increase in thermal stability is directly related to an increase in melt shear stability. Therefore, the sum of these effects permits extrusion speeds and orientation rates to be maintained with improvements in oxygen barrier properties.

Suitable polyvinylidene chloride for use in the present invention is commercially available. For instance, Dow Chemical sells PVDC-MA, and Solvay sells PVDC-VCl and PVDC-MA.

It is known that if a multilayer film containing a PVDC layer is electron beam irradiated, the PVDC tends to darken and degrade. Another benefit of the improved barrier characteristics resulting from the present invention is that a thinner PVDC layer can be used. When a thinner PVDC barrier layer is used, there is less PVDC to expose to radiation if an irradiation cross-linked multilayer film is desired. Since with the present invention the mass of PVDC exposed to irradiation is reduced, numerous cross-linked film combinations are available which were not heretofore feasible. In other words, a coextruded film with a thin PVDC layer can be post irradiated with no or minimal discoloration to the PVDC layer.

Common methods for determining overall thermal stability for extrusion of vinylidene chloride copolymer blends with additives such as plasticizers and stabilizers involve working the blend between a pair of heated rollers or inside a heated mixing chamber. The time required for shear and temperature-induced degradation to produce a noticeably blackened polymer is a measure of effectiveness of additives such as a plasticizer/stabilizer combination in promoting heat stability. Commercially acceptable vinylidene chloride copolymer additive combinations should show thermal stability times of 10–15 minutes or better in a mixing chamber such as a Brabender plasticorder at 300° F. (149° C.) to 330° F. (165° C.).

It has been unexpectedly found that when low weight-average molecular weight PVDC is employed, the addition of a processing aid increases thermal stability from around 12 minutes for conventional high molecular weight PVDC to around 20 minutes for low molecular weight PVDC. The weight average molecular weight of the PVDC should be not greater than about 100,000, more preferably not greater than about 95,000, even more preferably not greater than about 85,000. Furthermore, additional improvement of 26+ minute thermal stability can be achieved when low weight-average molecular weight PVDC has added thereto a processing aid which is also of low molecular weight not greater than about 700, more preferably not greater than about 500 molecular weight.

Thus, in one aspect, the present invention is an extrudable vinylidene chloride polymeric composition comprising by weight about 0.01% to 6.0%, preferably about 0.1% to 5.0%, more preferably about 0.2% to 4.0%, processing aid with the balance being vinylidene chloride copolymer of about 100,000 weight-average molecular weight or less. Preferred processing aids include, but are not limited to, epoxidized compounds, such as epoxidized linseed oil, expoxidized soybean oil, epichlorohydrin/bisphenol A, epoxidized octyl tallate, epoxidized glycol dioleate, butyl ester of epoxidized linseed oil fatty acid, and the like, which may be included in quantities up to about 6% by weight. Other suitable processing aids may include an additive such as 2-ethyl hexyl diphenyl phosphate, tetrasodium pyrophosphate, oxidized polyethylene, antioxidant, magnesium oxide, or chlorinated polyethylene.

In another aspect, the present invention is a multilayer polymeric film comprising first and second polymeric layers with a vinylidene chloride copolymer layer, containing up to about 6% by weight processing aid, disposed between said polymeric layers, in which the vinylidene chloride copolymer is of weight-average molecular weight of about 100000 or less. Also, (a) a film layer may be irradiated followed by extrusion coating the PVDC and another film layer followed by electron beam irradiation of the entire multilayer film, or (b) the multilayer film may be coextruded followed by electron beam irradiation of the entire multilayer film. Optionally, the multilayer film may be stretch oriented to make it heat shrinkable either before or after irradiation.

Irradiation of the entire multilayer film or a layer thereof may be accomplished by the use of high energy electrons. Preferably, electrons are employed up to about 6 megarads (MR) dosage level. The irradiation source can be any electron beam generator operating in a range of about 150 kilovolts to about 6 megavolts with a power output capable of supplying the desired dosage. The voltage can be adjusted to appropriate levels which may be for example 1,000,000 or 2,000,000 or 3,000,000 or 6,000,000 or higher or lower. Many apparatus for irradiating films are known to those of skill in the art. The irradiation is usually carried out at a dosage up to about 6 MR, typically between about 0.5 MR and about 6.0 MR, with a preferred dosage range of about 1 MR to about 4 MR. Irradiation can be carried out conveniently at room temperature, although higher and lower temperatures, for example, 0° C. to 60° C. may be employed.

In still another aspect, the present invention is a method of lowering the oxygen permeability and improving the thermal stability of a vinylidene chloride copolymer film comprising the steps of preparing a mixture comprising a vinylidene chloride copolymer of about 100,000 or less weight-average molecular weight and about 0.01% to 6%, preferably about 0.1% to 5.0%, by weight processing aid, blending said mixture; and thereafter extruding a film from the mixture. More preferably, the processing aid is present as about 0.2% to 4.0% by weight, and the weight-average molecular weight of the vinylidene chloride is about 95,000 or less.

Still other aspects of the present invention include irradiation of a multilayer film, which has a processing aid in the saran layer as specified above, to cross-link the cross-linkable layers. Such cross-linkable layers may be surface layers or internal layers in addition to the saran layer and are preferably polyolefins selected from the group consisting of ethylene-vinyl acetate copolymer (EVA), branched polyethylene (PE), linear low density and very low density polyethylene (LLDPE and VLDPE), low density polyethylene (LDPE), ethylene-butyl acrylate copolymer (EBA), ethylene-propylene copolymer (EPC), high density polyethylene (HDPE) and blends thereof. Suitable EVAs have a melt index (MI) above about 1.0, more preferably above about 1.2, even more preferably above about 1.5 decigram/minute. These include, but are not limited to LD722.62 supplied by Exxon, which is EVA (20% VA) with MI=3.0; LD318.92 supplied by Exxon, which is EVA (9% VA) with MI=2.0; Elvax 3128 supplied by duPont, which is EVA (9% VA) with MI=2.0; and NA-295-00 supplied by USI, which is EVA (6% VA) with MI=2.6. Suitable LLDPEs may be purchased from Dow Chemical, which include but are not limited to, Dowlex 2045.04, which has density=0.918 g/cc and MI=1.1 and comonomer=octene and Dowlex 2045.03, which has density=0.920 g/cc and MI=1.1 and comonomer=octene.

Any saran processing aid or mixtures thereof may be employed in the present invention, although processing aids which possess a thermally stabilizing influence defined by the five characteristics outlined in the *Encyclopedia of Polymer Science and Technology*, Volume 14 (1971), pages 174–175, are preferred. These characteristics are:

1. adsorb, or combine, with hydrochloric acid gas in an irreversible manner under the condition of use, but not have such strong affinity as to strip HCl from the polymer chain,
2. act as a selective ultraviolet light absorber to reduce the total ultraviolet energy absorbed in the polymer,
3. contain a reactive dienophilic molecule capable of destroying the discoloration by reacting with, and breaking up, the color-producing, conjugated polyene sequences,
4. possess anti-oxidant activity in order to prolong the induction period of the oxidation process and prevent the formation of carbonyl groups and other chlorine labilizing structures resulting from oxidation of polymer molecules,
5. have the ability to chelate metals, such as iron, and prevent the formation of metallic chloride which acts as a catalyst for polymer degradation.

Preferred ones include, but are not limited to those processing aids that have an oxirane (epoxy)

functionality. While it is not intended to be bound to any theory it is believed that this functionality reacts with the HCl liberated during dehydrochlorination of the PVDC molecular chain, thus binding both the hydrogen and chloride ions so as to slow the rate of saran degradation during saran melting and extrusion. Following reaction with HCl, the epoxy functionally is expected to form

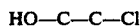

thus tying up the Cl which then is not available to degrade the saran during heating in the extruder. However, lower molecular weight processing aids work even better. While it is not intended to be bound to any theory, it is believed that the lower molecular weight processing aids work even better since mobility within the polymer is enhanced, since molecular weight is an indicator of molecular size. Also as the weight-average molecular weight of the PVDC is decreased, free volume within the polymer matrix is increased, an effect which it is believed also facilitates processing aid mobility. Epoxidized compound have oxirane functionalities and thus preferred processing aids are epoxidized compounds such as epoxidized linseed oil, epoxidized soybean oil, epichlorohydrin/bisphenol A, epoxidized tallate, epoxidized glycol dioleate, butyl ester of epoxidized linseed oil fatty acid and the like. Other processing aids may include an additive such as 2-ethyl hexyl diphenyl phosphate, tetrasodium pyrophosphate, oxidized polyethylene, antioxidant, magnesium oxide, or chlorinated polyethylene. Suitable epoxy compounds for use in the present invention may be purchased from C. P. Hall Company or Viking Chemical Company. Brochures entitled "Technical Data" from C. P. Hall Company describe their registered trademark Monoplex S-73 and Monoplex S-75, which are epoxy plasticizers for polyvinyl chloride (PVC). A brochure entitled "Vikoflex" from Viking Chemical Company describes their Vikoflex epoxy plasticizers and esters for PVC.

DEFINITIONS

As used herein, the following terms are understood to have the meaning set forth below:

"Polymer" means the product of polymerization and includes but is not limited to homopolymers, monopolymers, copolymers, interpolymers, terpolymers, block copolymers, graft copolymers, and addition copolymers.

"Processing aid" means a substance or material incorporated in a film or film layer to increase the flexibility, workability, or extrudability of the film. These substances include both monomeric plasticizers and polymeric plasticizers and are generally those materials which function by reducing the normal intermolecular forces in a resin thus permitting the macromolecules to slide over one another more freely. The art refers to many plasticizers as stabilizers. Thus, the terms "plasticizer" and "stabilizer" are intended to be used interchangeably herein.

"Oriented" or "Orientation" refer to the process of stretching a hot plastic article followed by rapidly cooling while in the stretched condition to realign a molecular configuration thus improving mechanical properties. Stretching in one direction is called uniaxial orientation and in two directions is called biaxial orientation. In thermoplastic flexible films which have been oriented there is an internal stress remaining in the plastic sheet which can be relieved by reheating the sheet to a temperature above that at which it was oriented. The material will then tend to shrink back to the original dimensions it had before it was stretch oriented. Thus "oriented" flexible films are "heat-shrinkable" flexible films, and the terms "oriented" and "heat-shrinkable" are used interchangeably herein. For clarity, it is noted that films made by a tubular process are referred to as having an orientation along the length of the tube, called the longitudinal direction (abbreviated herein as L) and/or across the width of the tube, called the transverse direction (abbreviated herein as T).

An "oriented" or "heat shrinkable" material is defined herein as a material which, when heated to an appropriate temperature above room temperature (for example 96° C.), will have a free shrink of about 5% or greater in at least one linear direction, as per ASTM D 2732.

"Melt index", abbreviated herein as MI, means melt flow measured at 190° C., 2.16 kilogram loading, as per ASTM D 1238, condition E.

"Vinylidene chloride polymer" or "vinylidene chloride copolymer" or "saran" or "PVDC" means vinylidene chloride copolymerized with at least one other monomer which includes, but is not limited to, vinyl chloride, $C_1$ to $C_8$ alkyl acrylates (such as methyl acrylate), $C_1$ to $C_8$ alkyl methacrylates, and acrylonitrile. As abbreviations employed here, PVDC is used to designate copolymers of vinylidene chloride, PVDC-MA designates vinylidene chloride/methyl acrylate copolymer and PVDC-VCl designates vinylidene chloride/vinyl chloride copolymer.

As used herein the term "extrusion" or the term "extruding" is intended to include coextrusion, extrusion coating, or combinations thereof, whether by tubular methods, planar methods, or combinations thereof.

"Barrier" refers to a property in thermoplastic materials which indicates that the particular material has a very low permeability to gases, such as oxygen. The principal barrier materials referred to herein are the vinylidene chloride copolymers designated as "PVDC". Other known barrier materials are hydrolyzed ethylene-vinyl acetate copolymers designated by the abbreviations: "EVAL" or "EVOH" or "HEVA", and polyamides, also known as nylons. The inventive film may optionally have one or more layers comprising EVOH or polyamide.

| ABBREVIATIONS AND MATERIALS EMPLOYED IN EXAMPLES | |
|---|---|
| Designation | Description |
| RH | Relative humidity |
| psi | Pounds per square inch |
| ft-lbf | Foot-pounds force |
| Sq in | Square inch |
| Sq m | Square meter |
| rpm | Rotations per minute |
| OTR | Oxygen transmission rate |
| L | Longitudinal direction of tubular film |
| T | Transverse direction of tubular film |
| (WA) MW | (Weight-Average) Molecular weight |
| PVDC | Vinylidene chloride copolymer |
| PVDC-MA | A copolymer of vinylidene chloride with methyl acrylate sold by Dow Chemical Company. It is about 91.5% VDC and about 8.5% MA by weight. |
| PVDC-MA (1) | Dow XU32034.00.   (WA) MW = 85,000. |
| PVDC-MA (2) | Dow XU32036.00.   (WA) MW = 95,000. |
| PVDC-MA (3) | Dow XU32027.01.   (WA) MW = 105,000. |
| PVDC-VCl | A copolymer of vinylidene chloride with vinyl chloride wherein (WA) MW = 85,000. It is about 91.5% VDC and 8.5% VCl by weight. |
| EPOXY (1) | Epichlorohydrin/bisphenol A, an epoxy resin sold by Shell as Epon 828. MW = 380. |
| EPOXY (2) | Epoxidized soybean oil, sold by Viking Chemical Company as Vikoflex 7177. MW = 1000. |
| EPOXY (3) | Epoxidized linseed oil, sold by Viking Chemical Company as Vikoflex 7190. MW = 1050. |
| EPOXY (4) | Butyl ester of epoxidized linseed oil fatty acid, sold by Viking Chemical Company as Vikoflex 9040. MW = 373. |
| EPOXY (5) | Epoxidized octyl tallate, sold by C. P. Hall Company as Monoplex S-73. MW = 413. |
| EPOXY (6) | Epoxidized glycol dioleate, sold by C. P. Hall Company as Monoplex S-75. MW = 637. |
| ASTM | American Society Testing Materials |
| °F. | Degrees Fahrenheit |
| °C. | Degrees Centigrade |

EXAMPLE I

Samples of 96% by weight PVDC-MA were mixed at room temperature with 4% by weight EPOXY for a total of 60 grams in a waring blender for 30 seconds at approximately 300 revolutions per minute. Each blend was subsequently charged to a Brabender Plasticorder mixing chamber which was heated to 320° F. (160° C.) by means of oil circulation between the chamber jacket and a Thermotron heat exchanger. Standard roller blades rotating at a 3:2 drive:driven ratio with the driven roller rotating at 63 rpm were used in all experiments. The thermal stability of each resin blend was determined by measuring the time within which the blend noticeably darkened to a standard shade of brown. The results are summarized in Table I below.

TABLE I

| SAMPLE | INGREDIENTS | | | | THERMAL STABILITY (MINUTES) |
|---|---|---|---|---|---|
| | PVDC-MA | MW | EPOXY | MW | |
| 1 | 1 | 85,000 | 1 | 380 | 26 |
| 2 | 1 | 85,000 | 2 | 1000 | 20 |
| 3 | 1 | 85,000 | 3 | 1050 | 18 |
| 4 | 1 | 85,000 | 4 | 373 | 25 |
| 5 | 1 | 85,000 | 5 | 413 | 22 |
| 6 | 1 | 85,000 | 6 | 637 | 20 |
| 7 | 2 | 95,000 | 1 | 380 | 14 |
| 8 | 2 | 95,000 | 2 | 1000 | 13 |
| 9 | 2 | 95,000 | 3 | 1050 | 15 |
| 10 | 2 | 95,000 | 4 | 413 | 14 |
| 11 | 2 | 95,000 | 5 | 637 | 14 |
| 12* | 3 | 105,000 | 1 | 380 | 13 |
| 13* | 3 | 105,000 | 2 | 1000 | 13 |
| 14* | 3 | 105,000 | 3 | 1050 | 12 |
| 15* | 3 | 105,000 | 4 | 413 | 13 |
| 16* | 3 | 105,000 | 5 | 637 | 12 |

*Comparison of high MW PVDC

As can be seen from comparison samples 12, 13, 14, 15 and 16, typical thermal stabilities of 12 or 13 minutes were obtained with typical high molecular weight PVDC of MW=105,000.

As can be seen from samples 7, 8, 9, 10 and 11, lowering the MW of the PVDC down to 95,000 resulted in a slight improvement in the thermal stability to 14 or 15 minutes.

However, as can be seen from samples 1–6, by decreasing the MW of the PVDC down to 85,000, a drastic improvement in thermal stability to 18 to 26 minutes was observed. Moreover, of these six samples with low MW PVDC, those which had EPOXY also of low MW, namely sample 1 (Epoxy 1 had MW=380) and sample 4 (EPOXY 4 had MW=373), were best with thermal stabilities of 26 and 25 minutes respectively.

EXAMPLE II

More PVDC samples are made as described in Example I, but this time the PVDC-MA is substituted with PVDC-VCl. The expected result is a similar trend in the thermal stability as with PVDC-MA.

EXAMPLE III

In a commercial-size blender, 480 pounds of PVDC-MA(1) was charged with initial low speed blending at 115° F. (46.1° C.), and then added thereto was 20 pounds of EPOXY(2) with high speed blending at 200° F. (93.3° C.). Then, the blend was discharged to an after cooler at 105° F. (40.6° C.). This was 96% by weight PVDC-MA(1) and 4% by weight EPOXY(2). From it was made 4-layer, stretched oriented film by extrusion coating as described in the laboratory examples of Brax et al U.S. Pat. No. 3,741,253. First a 2-layer substrate of the structure: blend of EVA +LLDPE/EVA was coextruded as a tube and then this was electron beam irradiated at about 4.5 MR. Then a layer of the blend of PVDC-MA(1)+EPOXY(2) and a layer of a blend of EVA +LLDPE were extrusion coated thereon so that the resultant from sealing layer to abuse layer had the structure: 10% LLDPE+90% EVA/EVA/96% PVDC-MA(1)+4% EPOXY(2)/9% LLDPE+91% EVA.

Percentages noted were by weight. The tubular film was then biaxially stretch oriented to a thickness of about 2.3 mils. The before orientation thickness of the PVDC-MA layer was about 2.2 mils and the after orientation thickness was about 0.18 mils. The PVDC-MA layer exhibited excellent melt shear stability during extrusion. The resultant stretch oriented film had an excellent oxygen permeability of 4.05 cc/mil/m$^2$/day/atm, which is 0.26 cc/mil/100 in$^2$/day/atm. Summarized below are the results of various tests conducted on the biaxially stretch oriented film.

| Physical Property | Tubular Direction | Average | Standard Deviation |
|---|---|---|---|
| Tensile Stress at Break (psi) | L | 8167 | 227 |
| | T | 9533 | 249 |
| Elongation to Break (%) | L | 207.9 | 5.8 |
| | T | 161.0 | 19.0 |
| Modulus (psi) | L | 32067 | 1693 |
| | T | 29667 | 1415 |
| Free Shrink (%, at 165° F.) | L | 13 | 1 |
| | T | 27 | 2 |
| Free Shrink (%, at 185° F.) | L | 28 | 2 |
| | T | 47 | 2 |
| Free Shrink (%, at 205° F.) | L | 54 | 1 |
| | T | 64 | 1 |
| Shrink Tension (psi, at 165° F.) | L | 155.48 | 20.07 |
| | T | 210.81 | 14.77 |
| Shrink Tension (psi, at 185° F.) | L | 339.82 | 27.48 |
| | T | 339.82 | 27.48 |
| Shrink Tension (psi, at 205° F.) | L | 229.21 | 7.70 |
| | T | 322.52 | 15.99 |
| Energy to Break (ft-lbf/sq in) | L | 1968.4 | 87.1 |
| | T | 1595.1 | 136.7 |
| Tear Propagation (gram-force) | L | 22.84 | 1.69 |
| | T | 51.99 | 33.19 |
| Haze (%) | | 3.4 | 0.6 |
| Gloss (45 degrees) | | 90 | 3 |
| Total Transmission (%) | | 91.2 | 0.2 |
| Oxen Transmission Rate (cc/sq m/day/atm) | | 22.5 | 0.7 |
| Saran layer gauge (mils) | | 0.18 | 0.01 |
| Oxygen permeability (cc/mil/m$^2$/day/atm) | | 4.05 | |
| Oxygen permeability (cc/mil/100 in$^2$/day/atm) | | 0.26 | |

(1) OTR data was measured with the Macon OX-TRAN at 73° F. and 0% RH.
(2) All mechanical property data were obtained at 73° F.
(3) Tensile and elongation were as per ASTM D-882.
(4) Haze was as per ASTM D 1003.
(5) Gloss was as per ASTM D 523.
(6) Free shrink was determined by measuring unrestrained shrink at the specified temp.
(7) Shrink tension was determined using restrained shrink at the specified temp.
(8) Tear propagation was as per ASTM D 1938.

EXAMPLE IV

As in Example III, blends of PVDC-MA(1) were made but with EPOXY(4) and in 100 pound (220 kg) batches. Also, 100 pound (220 kg) batches of PVDC-MA(3) with Epoxy (4) were made. From the blends were made 4-layer, stretched oriented films by extrusion coating as described in the laboratory examples of Brax et al U.S. Pat. No. 3,741,253. First a 2-layer substrate of the structure: blend of EVA+LLDPE/EVA was coextruded as a tube and then this was electron beam irradiated at about 4.5 MR. Then a layer of the blend of PVDC-MA+ EPOXY(4) and a layer of a blend of EVA+LLDPE were extrusion coated thereon so that the resultant from sealing layer to abuse layer had the structure: 10% LLDPE+90% EVA/EVA/96% PVDC-MA+4% EPOXY(4)/9% LLDPE+91% EVA. Percentages noted were by weight. The tubular film was then biaxially stretch oriented. The before orientation thickness of the layers from sealing layer to abuse layer was about 3.5 mils/12.1 mils/2.2 mils/6.0 mils. The resultant stretch oriented films had a thickness of about 2.3 mils. The PVDC-MA layer after orientation was about 0.18 mils. This PVDC-MA layer exhibited excellent melt shear stability and thermal stability during extrusion. The following were made (percentages noted were by weight).

| PVDC-MA (1) | PVDC-MA (3) | EPOXY (4) | Oxygen Permeability *per m$^2$ (100 in$^2$) | 0.18 mil thickness PVDC-MA layer Oxygen Transmission Rate **per m$^2$ (100 in$^2$) |
|---|---|---|---|---|
| 97% | 0 | 3% | 3.27 (0.21) | 18.17 (1.17) |
| 96% | 0 | 4% | 5.29 (0.34) | 29.39 (1.90) |
| 95% | 0 | 5% | 6.81 (0.43) | 37.83 (2.44) |
| 94% | 0 | 6% | 6.06 (0.39) | 33.67 (2.17) |
| 0 | 97% | 3% | 3.01 (0.19) | 16.72 (1.08) |
| 0 | 96% | 4% | 4.79 (0.31) | 26.61 (1.72) |
| 0 | 95% | 5% | 5.31 (0.34) | 29.50 (1.90) |
| 0 | 94% | 6% | 7.98 (0.51) | 44.33 (2.86) |

*The first number shows the oxygen permeability as cc/mil/m$^2$/day/atm, and the second number with the parentheses shows the oxygen permeability converted into cc/mil/100 in$^2$/day/atm.
**The first number shows the oxygen transmission rate as cc/m$^2$day/atm, whereas the second number with the parentheses shows the oxygen transmission rate converted into cc/100 in$^2$/day/atm.

EXAMPLE V

A 3-layer film is coextruded as a tube per the process described in Baird et al U.S. Pat. No. 4,112,181 having the structure EVA/PVDC-MA(1)/EVA wherein the PVDC-MA(1) core layer contains by weight 1% Santicizer 141 (2-ethyl hexyl diphenyl phosphate) and 3% EPON 828 (epichlorohydrin/bisphenol A). The film is biaxially stretch oriented and then electron beam irradiated at 1 MR. The before-orientation thickness of the PVDC layer is about 2.2 mils and the after-orientation thickness is about 0.18 mil, whereas prior art films are typically made with a PVDC layer having a 3.0 to 3.5 mil before-orientation thickness and 0.30 to 0.32 mils after-orientation thickness. The saran layer exhibits excellent melt shear stability during extrusion and minimal discoloration after irradiation, and oxygen barrier properties comparable to the thicker saran layer prior art film.

EXAMPLE VI

The process of Example V is repeated except this time PVDC-VCl, MW=85,000 is used instead of PVDC-MA(1). Similar oxygen barrier properties, similar melt shear stability during extrusion and minimal discoloration after irradiation are exhibited, as for the film of Example V.

EXAMPLE VII A 3-layer film is made by extrusion coating as described in the laboratory examples of Brax et al U.S. Pat. No. 3,741,253, wherein first a substrate of EVA is extruded as a tube and is irradiated by electron beam at 4 MR and then by extrusion coating a layer of PVDC-MA(1) and a layer of EVA are added thereto so that the resultant is from sealing layer to abuse layer of the structure: EVA/PVDC-MA/EVA. The PVDC-MA(1) contains by weight 1% Santicizer 141 (2-ethyl hexyl diphenyl phosphate) and 3% EPON 828 (epichlorohydrin/bisphenol A). The film is biaxially stretch oriented and then is post-irradiated at about 1 MR. The before-orientation thickness of the PVDC layer is about 2.2 mils and the after-orientation thickness is about 0.18 mil, whereas prior art films are typically made with a PVDC layer having a 3.0 to 3.5 mil before-orientation thickness and 0.30 to 0.32 mil after-orientation thickness. The saran layer exhibit excellent melt shear stability during extrusion and minimal discoloration after irradiation, and oxygen barrier properties comparable to the thicker saran prior art film.

EXAMPLE VIII

Example VII is repeated except with PVDC-VCl, MW=85,000 instead of PVDC-MA(1). Similar oxygen barrier properties, similar melt shear stability during extrusion and minimal discoloration after irradiation are exhibited, as for the film of Example VII.

While certain representative embodiments and details have been shown for the purpose of illustration, numerous modifications to the formulations described above can be made without departing from the invention disclosed.

What is claimed is:

1. A multilayer, extruded, polymeric film comprising:
   (a) first and second polymeric film layers; and
   (b) a barrier layer disposed between said first and second layers, said barrier layer comprising
      (1) about 0.01% to 6% processing aid by weight, wherein the processing aid possesses an epoxy functionality, and
      (2) low weight-average molecular weight vinylidene chloride copolymer wherein the major portion over 50% by weight of the copolymer is vinylidene chloride.

2. The film of claim 1 wherein the processing aid is selected from epichlorohydrin/bisphenol A epoxy resin, epoxidized linseed oil, epoxidized soybean oil, epoxidized octyl tallate, epoxidized glycol dioleate, butyl ester of epoxidized linseed oil fatty acid, tetrasodium pyrophosphate, oxidized polyethylene, antioxidant, 2-ethyl hexyl diphenyl phosphate, chlorinated polyethylene, or mixtures thereof.

3. The film of claim 1 wherein said multilayer film has been irradiated by electron beam with a dosage of about 0.5 MR to about 6 MR.

4. The film of claim 1 wherein said first and second layers comprise polyolefin materials.

5. The film of claim 4 wherein said polyolefin materials are selected from ethylene/vinyl acetate copolymer, branched polyethylene, low density polyethylene, linear low density polyethylene, linear very low density polyethylene, ethylene/butyl acrylate copolymer, ethylene/propylene copolymer, high density polyethylene or mixtures thereof.

6. The film of claim 1 wherein the weight-average molecular weight of the vinylidene chloride is about 100,000 or less.

7. The film of claim 1 wherein the molecular weight of the processing aid is about 700 or less.

8. The film of claim 1 wherein the vinylidene chloride copolymer layer is not greater than about 0.29 mil thick.

9. A multilayer biaxially stretched heat-shrinkable film comprising a first layer of ethylene vinyl acetate copolymer having a melt index greater than about 1.2 decigram/minute, a second layer of ethylene vinyl acetate copolymer having a melt index greater than about 1.2 decigram/minute, and disposed therebetween a core layer of vinylidene chloride copolymer, said vinylidene chloride copolymer layer being on each surface in direct surface-to-surface contact with each of said first and second ethylene vinyl acetate copolymer layers, wherein the major portion over 50% by weight of the vinylidene chloride copolymer is vinylidene chloride, and said vinylidene copolymer layer contains a processing aid of molecular weight less than about 700, wherein the processing aid possesses an epoxy functionality, and said vinylidene chloride copolymer is of weight-average molecular weight less than about 100,000, and said vinylidene chloride copolymer layer has a thickness less than about 0.29 mils.

10. The film of claim 9 wherein the vinylidene chloride copolymer layer has a thickness of about 0.18 mil and the multi-layer film exhibits an oxygen transmission rate of less than about 45 cc/sq m/24 hours/atmosphere in accordance with ASTM D 3985.

* * * * *